(12) United States Patent
Kosaka et al.

(10) Patent No.: US 10,240,563 B2
(45) Date of Patent: Mar. 26, 2019

(54) SCAVENGED GAS AMOUNT CALCULATION DEVICE AND INTERNAL EGR AMOUNT CALCULATION DEVICE FOR INTERNAL COMBUSTION ENGINE

(71) Applicant: HONDA MOTOR CO., LTD., Wako-shi, Saitama (JP)

(72) Inventors: Yosuke Kosaka, Wako (JP); Koichiro Shinozaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 667 days.

(21) Appl. No.: 13/941,883

(22) Filed: Jul. 15, 2013

(65) Prior Publication Data

US 2014/0020656 A1 Jan. 23, 2014

(30) Foreign Application Priority Data

Jul. 17, 2012 (JP) ................. 2012-158322

(51) Int. Cl.
  *F02D 13/02* (2006.01)
  *F02M 26/01* (2016.01)
(52) U.S. Cl.
  CPC ......... *F02M 26/01* (2016.02); *F02D 13/0265* (2013.01); *Y02T 10/18* (2013.01)
(58) Field of Classification Search
  CPC ....... Y02T 10/18; Y02T 10/121; Y02T 10/47; F02D 13/0265; F02D 13/0261;
  (Continued)

(56) References Cited

U.S. PATENT DOCUMENTS 6,904,356 B2 * 6/2005 Uchida ............... F02D 13/0219
  123/568.14
7,275,516 B1 * 10/2007 Cunningham ...... F02D 13/0261
  123/305
(Continued)

FOREIGN PATENT DOCUMENTS

DE 601 28 438 T2 9/2007
JP 2004-251182 A 9/2004
(Continued)

OTHER PUBLICATIONS

German Search Report application No. 10 2013 2014 039.8 dated Mar. 28, 2014.
(Continued)

*Primary Examiner* — Hai H Huynh
*Assistant Examiner* — Gonzalo Laguarda
(74) *Attorney, Agent, or Firm* — Squire Patton Boggs (US) LLP

(57) ABSTRACT

A scavenged gas amount calculation device for an internal combustion engine, which is capable of accurately calculating a scavenged gas amount under conditions where scavenged gases are produced during a valve overlap time period, and an internal EGR amount calculation device for the engine, which is capable of calculating an internal EGR amount using the scavenged gas amount thus calculated. The internal EGR amount calculation device includes an ECU. The ECU calculates a basic blown-back gas amount using an average intake pressure, a maximum exhaust pressure, and a correction coefficient (step 6), calculates a scavenged gas amount using the average intake pressure, a minimum exhaust pressure, and a scavenge ratio (step 8), calculates a blown-back gas amount by correcting the basic blown-back gas amount by the scavenged gas amount (step 11), and calculates the internal EGR amount according to the blown-back gas amount (step 12).

18 Claims, 12 Drawing Sheets

(58) Field of Classification Search
CPC ........... F02D 2041/001; F02D 41/0072; F02D 41/0062; F02D 41/006; F02M 25/0752
USPC ...... 123/90.15, 564, 568.14, 568.15, 568.22, 123/572, 573, 574; 701/108
See application file for complete search history.

(56) References Cited

U.S. PATENT DOCUMENTS

| | | | |
|---|---|---|---|
| 2004/0139949 A1* | 7/2004 | Koseki | F01L 1/20 123/568.14 |
| 2011/0040476 A1 | 2/2011 | Ogawa et al. | |

FOREIGN PATENT DOCUMENTS

| | | |
|---|---|---|
| JP | 2005-307810 A | 11/2005 |
| JP | 2006-322335 A | 11/2006 |
| JP | 2007-100522 A | 4/2007 |
| JP | 2008-075549 A | 4/2008 |
| JP | 2011-140895 A | 7/2011 |

OTHER PUBLICATIONS

Japanese Patent Office, Office Action for corresponding Patent Appln. No. 2012-158322, dated Aug. 4, 2015.

* cited by examiner

WHEN CAIN=CAEX=0

WHEN CAIN=CAEX=CAREF

WHEN CAIN=CAIN_ad, CAEX=CAEX_rt

F I G. 6
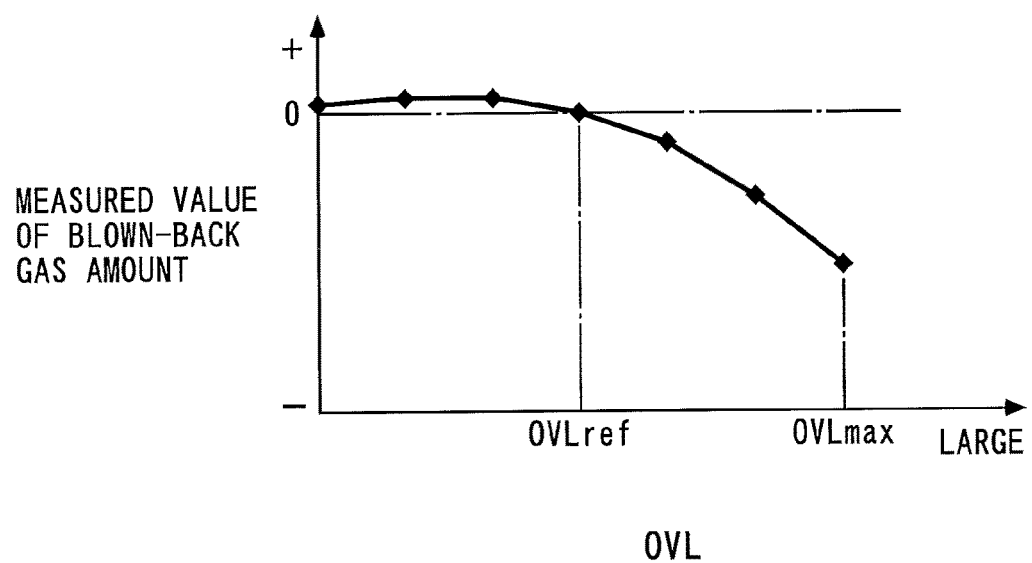

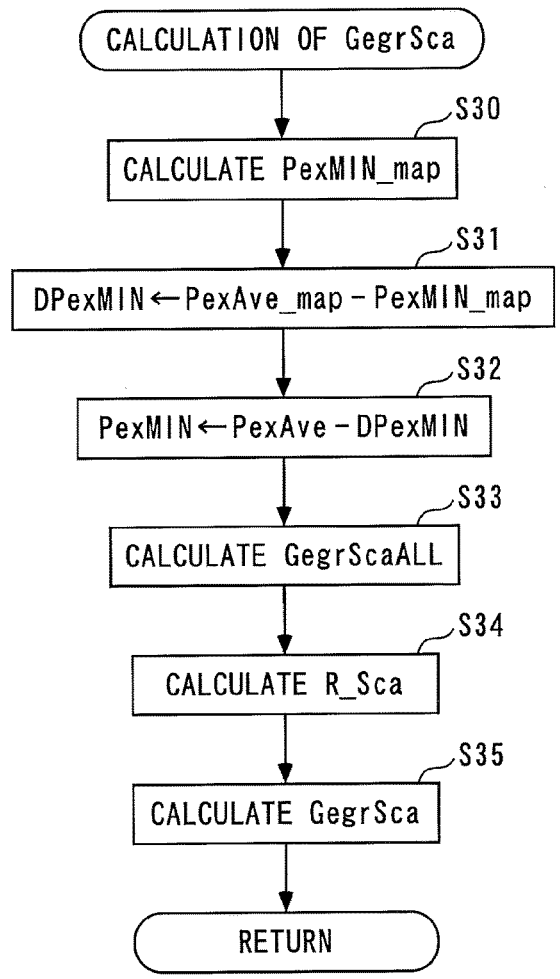

FIG. 13

| OVL \ NE | NE1 | ... | NEj |
|---|---|---|---|
| OVL1 | R_sca11 | ... | R_sca1j |
| ⋮ | ⋮ | | ⋮ |
| OVLi | R_scai1 | ... | R_scaij |

SCAVENGED GAS AMOUNT CALCULATION DEVICE AND INTERNAL EGR AMOUNT CALCULATION DEVICE FOR INTERNAL COMBUSTION ENGINE

BACKGROUND OF THE INVENTION

Field of the Invention

The present invention relates to a scavenged gas amount calculation device for an internal combustion engine, which calculates a scavenged gas amount, and an internal EGR amount calculation device which calculates an internal EGR amount using the scavenged gas amount.

Description of the Related Art

Conventionally, an internal EGR amount calculation device for an internal combustion engine is known as disclosed in Japanese Laid-Open Patent Publication (Kokai) No. 2004-251182 is known. In this internal EGR amount calculation device, an internal EGR amount is calculated by adding the amount of blown-back gases (blown-back gas amount) to the amount of residual burned gases. The amount of residual burned gases represents the amount of burned gases remaining in a cylinder, and is calculated, specifically, using the equation of state of gas.

Further, the amount of blown-back gases represents the amount of burned gases blown back into the cylinder after the burned gases flows from an exhaust passage into an intake passage due to a pressure difference between the intake passage and the exhaust passage, during a valve overlap time period. The amount of blown-back gases is calculated using a calculation equation to which is applied the nozzle equation by regarding a path through which burned gases flow as a nozzle.

The nozzle equation includes a time-integral value $\Sigma(\mu A)$ of an effective opening area. The time-integral value $\Sigma(\mu A)$ of the effective opening area is calculated specifically by calculating a crank angle-integral value f1 (OL) by integrating the effective opening area with respect to a crank angle, and dividing the crank angle-integral value f1 (OL) by a rotational speed NE of the engine.

As mentioned hereinabove, the blown-back gases are produced during the valve overlap time period due to a pressure difference between the intake passage and the exhaust passage, and hence depending on the relationship between a pressure within the intake passage (hereafter referred to as "the intake pressure") and a pressure within the exhaust passage (hereafter referred to as "the exhaust pressure"), it sometimes occurs that the amount of blown-back gases decreases or no blown-back gases are produced. For example, in a case where the valve overlap time period is relatively long, when the engine is in high-load operation or when the engine is a supercharger-equipped engine, which is performing supercharging, the intake pressure sometimes becomes higher than the exhaust pressure. In such a case, burned gases in the cylinder are scavenged into the exhaust passage by air flowing into the cylinder. Hereafter, burned gases which are scavenged from within the cylinder into the exhaust passage are referred to as "scavenged gases". The internal EGR amount disclosed in Japanese Laid-Open Patent Publication (Kokai) No. 2004-251182 does not take such scavenged gases into account, and hence under conditions where scavenged gases are produced, the calculation accuracy of the internal EGR amount is reduced.

SUMMARY OF THE INVENTION

It is an object of the present invention to provide a scavenged gas amount calculation device for an internal combustion engine, which is capable of calculating a scavenged gas amount with accuracy under conditions where scavenged gases are produced during a valve overlap time period, and an internal EGR amount calculation device for an internal combustion engine, which is capable of calculating an internal EGR amount with accuracy using the scavenged gas amount thus calculated.

To attain the above object, in a first aspect of the present invention, there is provided a scavenged gas amount calculation device for an internal combustion engine in which a valve overlap time period of an intake valve and an exhaust valve of a cylinder is changed by changing valve timing of at least one of the intake valve and the exhaust valve, comprising intake pressure parameter-obtaining means for obtaining an intake pressure parameter indicative of an intake pressure which is a pressure within an intake passage of the engine, exhaust pressure parameter-obtaining means for obtaining an exhaust pressure parameter indicative of an exhaust pressure which is a pressure within an exhaust passage of the engine, time period parameter-obtaining means for obtaining a time period parameter indicative of a length of the valve overlap time period, and scavenged gas amount-calculating means for calculating a scavenged gas amount which is an amount of gases scavenged from within the cylinder of the engine into the exhaust passage when the intake pressure is higher than the exhaust pressure during the valve overlap time period, according to the intake pressure parameter, the exhaust pressure parameter, and the time period parameter.

With the configuration of this scavenged gas amount calculation device, the scavenged gas amount which is an amount of gases scavenged from within the cylinder into the exhaust passage under a scavenging state of the engine where the intake pressure is higher than the exhaust pressure during the valve overlap time period is calculated according to the intake pressure parameter, the exhaust pressure parameter, and the time period parameter. In this case, the intake pressure parameter represents the intake pressure which is a pressure within the intake passage of the engine, the exhaust pressure parameter represents the exhaust pressure which is a pressure within the exhaust passage of the engine, and the time period parameter represents a length of the valve overlap time period, and hence under conditions where the intake pressure is higher than the exhaust pressure, causing the scavenged gases to be produced, during the valve overlap time period, it is possible to calculate the scavenged gas amount while causing the length of the valve overlap time period which is highly correlated with the scavenged gas amount to be reflected thereon. This makes it possible to calculate the scavenged gas amount with accuracy under conditions where the scavenged gases are produced during the valve overlap time period (Note that throughout the specification, the term "obtain" used in the phrases "obtaining an intake pressure parameter", "obtaining an exhaust pressure parameter", "obtaining a time period parameter", and so forth is intended to include the meaning of directly detecting the parameters using sensors or the like, and estimating these parameters based on other parameters).

Preferably, the exhaust pressure parameter-obtaining means includes minimum exhaust pressure-calculating means for calculating, as the exhaust pressure parameter, a minimum exhaust pressure which is a minimum value of the exhaust pressure during the valve overlap time period, according to a value indicative of an operating condition of the engine, and the scavenged gas amount-calculating means includes scavenged gas production degree parameter-calculating means for calculating a scavenged gas production degree parameter indicative of a degree of production of the scavenged gases during the valve overlap time period, according to the time period parameter, and calculates the scavenged gas amount according to the scavenged gas production degree parameter, the intake pressure parameter, and the minimum exhaust pressure.

With the configuration of the preferred embodiment, the minimum exhaust pressure which is the minimum value of the exhaust pressure during the valve overlap time period is calculated as the exhaust pressure parameter according to a value indicative of an operating condition of the engine, and the scavenged gas production degree parameter indicative of a degree of production of the scavenged gases during the valve overlap time period is calculated according to the time period parameter. The scavenged gas amount is calculated according to the scavenged gas production degree parameter, the intake pressure parameter, and the minimum exhaust pressure. In this case, the minimum exhaust pressure and the length of the valve overlap time period are highly correlated with the scavenged gas amount during the valve overlap time period, as will be explained hereinafter, and hence by calculating the scavenged gas amount while causing the such minimum exhaust pressure and length of the valve overlap time period, and the scavenged gas production degree parameter to be reflected thereon, it is possible to further improve the calculation accuracy of the scavenged gas amount.

More preferably, the minimum exhaust pressure-calculating means includes average exhaust pressure-calculating means for calculating an average exhaust pressure which is an average value of the pressure within the exhaust passage over a predetermined time period, and minimum amplitude-calculating means for calculating a minimum amplitude for use in calculating the minimum exhaust pressure, according to the value indicative of the operating condition of the engine, and calculates the minimum exhaust pressure based on the average exhaust pressure and the minimum amplitude.

With the configuration of the preferred embodiment, the average exhaust pressure which is an average value of the pressure within the exhaust passage during a predetermined time period is calculated, and the minimum amplitude for use in calculating the minimum exhaust pressure is calculated according to the value indicative of the operating condition of the engine. The minimum exhaust pressure is calculated based on the average exhaust pressure and the minimum amplitude. Therefore, by using a map search method or a calculation equation as a method of calculation of the minimum amplitude, it is possible to reduce computational load compared with a case where the exhaust pressure is successively sampled at a very short sampling repetition period and the minimum exhaust pressure is calculated based on results of the sampling.

Preferably, the scavenged gas amount-calculating means calculates the scavenged gas amount as a larger value as the valve overlap time period represented by the time period parameter is longer.

It was confirmed by experiment conducted by the present assignee that in a case where the scavenged gases are produced due to the intake pressure being higher than the exhaust pressure during the valve overlap time period, the scavenged gas amount increases as the valve overlap time period is longer (see FIGS. 3A to 5B, referred to hereinafter). Therefore, with the configuration of the preferred embodiment, as the scavenged gas amount is more likely to be increased, the scavenged gas amount is calculated as a larger value accordingly. As a result, it is possible to secure an excellent calculation accuracy.

To attain the above object, in a second aspect of the present invention, there is provided an internal EGR amount calculation device for an internal combustion engine, including the scavenged gas amount calculation device provided as the first aspect of the invention, the engine being configured to have an internal EGR amount thereof changed according to a change of the valve overlap time period, the internal EGR amount calculation device comprising blown-back gas amount-calculating means for calculating a blown-back gas amount which is an amount of gases which temporarily flow out of the cylinder into at least one of an intake system and an exhaust system and thereafter flow back into the cylinder again, corrected blown-back gas amount-calculating means for calculating a corrected blown-back gas amount by correcting the blown-back gas amount by the scavenged gas amount, and internal EGR amount-calculating means for calculating the internal EGR amount according to the corrected blown-back gas amount.

With the configuration of this internal EGR amount calculation device, the scavenged gas amount and the blown-back gas amount are calculated, as described hereinbefore, and the corrected blown-back gas amount is calculated by correcting the blown-back gas amount by the scavenged gas amount. Therefore, the corrected blown-back gas amount provides a value obtained by causing the scavenged gas amount to be reflected on the blown-back gas amount. Therefore, the internal EGR amount is calculated according to the such corrected blown-back gas amount, and hence it is possible to calculate the internal EGR amount while causing the scavenged gas amount to be reflected thereon. This makes it possible to improve the calculation accuracy of the internal EGR amount compared with Japanese Laid-Open Patent Publication (Kokai) No. 2004-251182 in which the scavenged gas amount is not taken into account in calculating the internal EGR amount.

Preferably, the exhaust pressure parameter-obtaining means includes maximum exhaust pressure-calculating means for calculating, as the exhaust pressure parameter, a maximum exhaust pressure which is a maximum value of the exhaust pressure during the valve overlap time period, according to the value indicative of the operating condition of the engine, and the blown-back gas amount-calculating means includes a blown-back gas production degree parameter indicative of a degree of production of the blown-back gases during the valve overlap time period, according to the time period parameter, and calculates the blown-back gas amount according to the blown-back gas production degree parameter, the intake pressure parameter, and the maximum exhaust pressure.

In general, in a case where the blown-back gas amount is calculated for an internal combustion engine having a valve overlap time period, since the blown-back gases are produced under a condition that the exhaust pressure is higher than the intake pressure, the blown-back gas amount is highly correlated with the maximum value of the exhaust pressure during the valve overlap time period. Therefore, with configuration of this preferred embodiment, the maximum exhaust pressure which is the maximum value of the exhaust pressure during the valve overlap time period is calculated as the exhaust pressure parameter, and the blown-back gas production degree parameter indicative of a degree of production of the blown-back gases during the valve overlap time period is calculated according to the time period parameter. Further, the blown-back gas amount is calculated according to the such blown-back gas production degree parameter, intake pressure parameter, and maximum exhaust pressure. Therefore, it is possible to further improve the calculation accuracy of the blown-back gas amount. Further, since the blown-back gas amount is calculated according to the maximum exhaust pressure, it is possible to more easily calculate the blown-back gas amount and thereby reduce computational load compared with a method disclosed in Japanese Laid-Open Patent Publication (Kokai) No. 2004-251182 which executes integral calculation of the effective opening area is executed.

Preferably, the maximum exhaust pressure-calculating means includes average exhaust pressure-calculating means for calculating an average exhaust pressure which is an average value of the pressure within the exhaust passage during a predetermined time period, and maximum amplitude-calculating means for calculating a maximum amplitude for use in calculating the maximum exhaust pressure, according to the value indicative of the operating condition of the engine, and calculates the maximum exhaust pressure according to the average exhaust pressure and the maximum amplitude.

With the configuration of the preferred embodiment, the average exhaust pressure which is an average value of the pressure within the exhaust passage during a predetermined time period is calculated, and the maximum amplitude for use in calculating the maximum exhaust pressure is calculated according to the value indicative of the operating condition of the engine. The maximum exhaust pressure is calculated according to the average exhaust pressure and the maximum amplitude. Therefore, by using a map search method or a calculation equation as a method of calculation of the maximum amplitude, it is possible to reduce computational load compared with a case where the exhaust pressure is successively sampled at a very short sampling repetition period, and the maximum exhaust pressure is calculated based on results of the sampling.

The above and other objects, features, and advantages of the present invention will become more apparent from the following detailed description taken in conjunction with the accompanying drawings.

BRIEF DESCRIPTION OF THE DRAWINGS

FIG. 6 is a diagram showing a relationship between a measurement value of a blown-back gas amount and an overlap angle;

FIG. 11 is a diagram showing an example of a map for use in calculating a correction coefficient;

FIG. 12 is a diagram showing a process for calculating a scavenged gas amount;

FIG. 13 is a diagram showing a map for use in calculating a scavenge ratio;

DETAILED DESCRIPTION OF PREFERRED EMBODIMENTS

Figure 1:
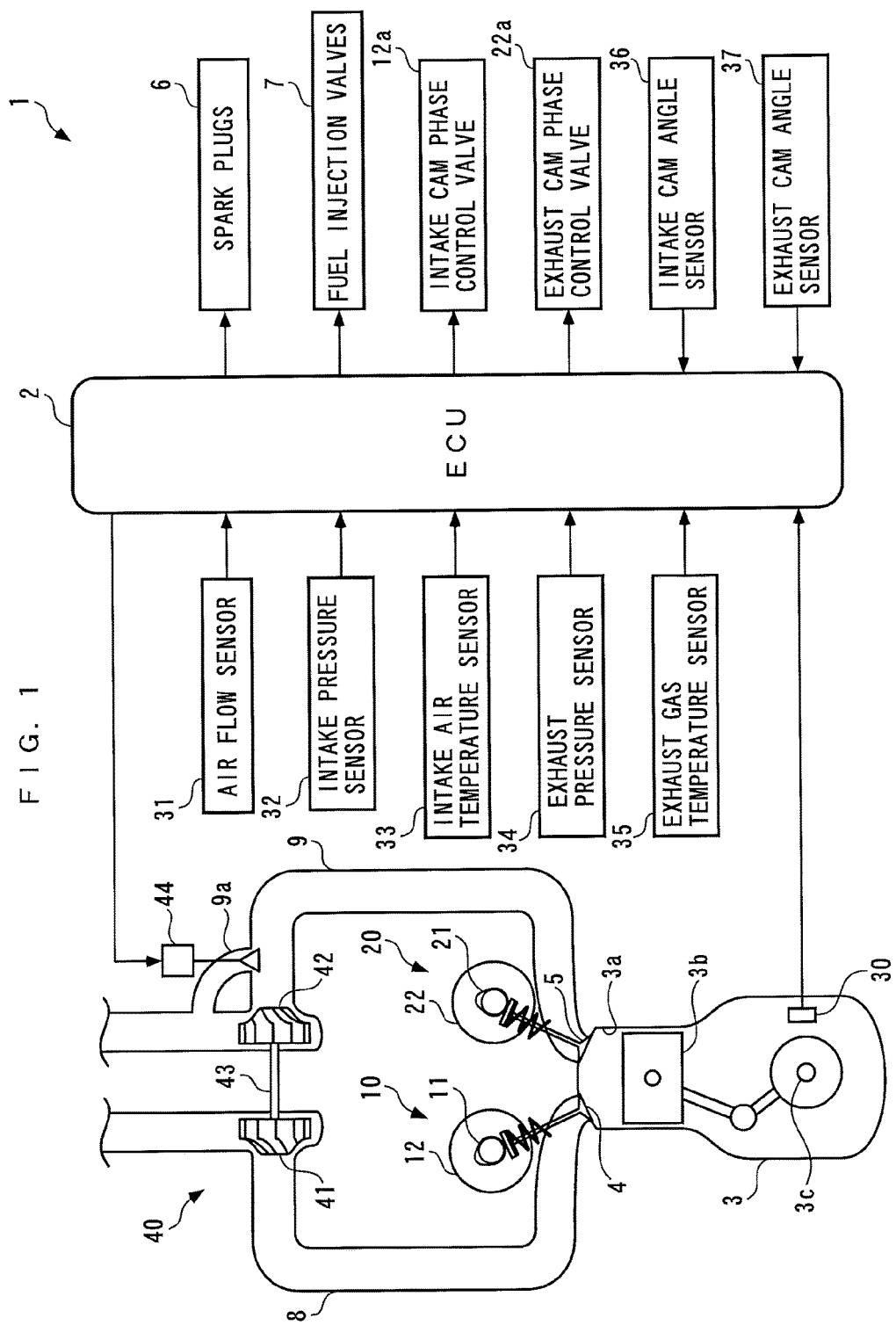
FIG. 1 is a schematic diagram of a scavenged gas amount calculation device and an internal EGR calculation device according to an embodiment of the present invention, and an internal combustion engine to which the calculation devices are applied.

Hereafter, an internal EGR amount calculation device for an internal combustion engine according to an embodiment of the invention will be described with reference to drawings. The internal EGR amount calculation device 1 according to the present embodiment also serves as a scavenged gas amount calculation device, and as shown in FIG. 1, the internal EGR amount calculation device 1 includes an ECU 2. The ECU 2 calculates a scavenged gas amount and an internal EGR amount by a method described hereinafter, and controls operating conditions of the internal combustion engine (hereafter referred to as the "engine") 3.

The engine 3 is an in-line four-cylinder gasoline engine having four pairs of cylinders 3a and pistons 3b (only one pair of which is shown), and is installed on a vehicle, not shown. The engine 3 includes intake valves 4 (only one of which is shown) provided for the respective cylinders 3a, exhaust valves 5 (only one of which is shown) provided for the respective cylinders 3a, an intake valve-actuating mechanism 10 for actuating the intake valves 4 to open and close the same, an exhaust valve-actuating mechanism 20 for actuating the exhaust valves 5 to open and close the same, and so forth.

The intake valve-actuating mechanism 10 comprises an intake cam shaft 11 for actuating the intake valves 4, and a variable intake cam phase mechanism 12. The variable intake cam phase mechanism 12 steplessly (i.e. continuously) changes a phase CAIN of the intake camshaft 11 with respect to a crankshaft 3c (hereafter referred to as the "intake cam phase CAIN") to an advanced side or a retarded side, to thereby change the valve timing of each intake valve 4.

The variable intake cam phase mechanism 12 is disposed at an end of the intake cam shaft 11 toward an intake sprocket (not shown).

Although the variable intake cam phase mechanism 12 is configured, specifically, similarly to one proposed by the present assignee in Japanese Laid-Open Patent Publication (Kokai) No. 2007-100522, and hence detailed description thereof is omitted, the variable intake cam phase mechanism 12 includes an intake cam phase control valve 12a. In the case of the variable intake cam phase mechanism 12, the intake cam phase control valve 12a is controlled by a drive signal from the ECU 2, whereby the intake cam phase CAIN is continuously varied between a predetermined origin value CAIN_0 and a predetermined most advanced value CAIN_ad. This steplessly changes the valve timing of each intake valve 4 between an origin timing indicated by a solid line in FIG. 2 and the most advanced timing indicated by a one-dot chain line in FIG. 2. Note that in FIG. 2, an exhaust top dead center is denoted as "EXHAUST TDC". This also applies to figures, referred to hereinafter.

In this case, the predetermined origin value CAIN_0 is set to 0, and the predetermined most advanced value CAIN_ad is set to a predetermined positive value. Therefore, as the intake cam phase CAIN is increased from 0, the valve timing of each intake valve 4 is changed to a more advanced timing than the origin timing, whereby a valve overlap time period of each intake valve 4 and each exhaust valve 5 becomes longer.

The exhaust valve-actuating mechanism 20 comprises an exhaust cam shaft 21 for actuating the exhaust valves 5, and a variable exhaust cam phase mechanism 22. The variable exhaust cam phase mechanism 22 steplessly (i.e. continuously) changes a phase CAEX of the exhaust cam shaft 21 with respect to the crankshaft 3c (hereafter referred to as the "exhaust cam phase CAEX") to the advanced side or the retarded side, to thereby change the valve timing of each exhaust valve 5. The variable exhaust cam phase mechanism 22 is disposed at an end of the exhaust camshaft 21 toward an exhaust sprocket (not shown).

The variable exhaust cam phase mechanism 22 is configured similarly to the above-described variable intake cam phase mechanism 12, and includes an exhaust cam phase control valve 22a. In the case of the variable exhaust cam phase mechanism 22, the exhaust cam phase control valve 22a is controlled by a drive signal from the ECU 2, whereby the exhaust cam phase CAEX is continuously varied between a predetermined origin value CAEX_0 and a predetermined most retarded value CAEX_rt. This steplessly changes the valve timing of each exhaust valve 5 between an origin timing indicated by a solid line in FIG. 2 and the most retarded timing indicated by a broken line in FIG. 2.

In this case, the predetermined origin value CAEX_0 is set to 0, and the predetermined most retarded value CAEX_rt is set to the above-mentioned positive value. Therefore, as the exhaust cam phase CAEX is increased from 0, the valve timing of each exhaust valve 5 is changed to a more retarded timing than the origin timing, whereby the valve overlap time period becomes longer.

Note that when there is such a valve overlap time period, there occur, as described hereinafter, a phenomenon in which burned gases temporarily flow out of the cylinder 3a into an exhaust passage 9 (exhaust system) and thereafter flow into the cylinder 3a again, or a phenomenon in which burned gases temporarily flow through the cylinder 3a into an intake passage 8 (intake system) and thereafter flow into the cylinder 3a again. In the following description, such burned gases that temporarily flow out of the cylinder 3a into the exhaust passage 9 and thereafter finally flow back into the cylinder 3a before closing timing of the intake valve 4, as described above, will be referred to as "blown back gases", and the amount of the blown back gases will be referred to as the "blown back gas amount".

Further, as will be described hereinafter, during the valve overlap time period, when the pressure within the intake passage 8 becomes higher than the pressure within the exhaust passage 9, there occurs a phenomenon in which burned gases within the cylinder 3a are scavenged into the exhaust passage 9 by gases within the intake passage 8. In the following description, burned gases scavenged from within the cylinder 3a into the exhaust passage 9 are referred to as "scavenged gases" and the amount of scavenged gases is referred to as the "scavenged gas amount".

Further, the engine 3 is provided with spark plugs 6, fuel injection valves 7, a crank angle sensor 30, and a turbocharger 40. The spark plugs 6 and the fuel injection valves 7 are provided for the respective cylinders 3a (only one of each of which is shown). The fuel injection valves 7 are mounted in an intake manifold such that fuel is injected into intake ports of the respective cylinders 3a. Both the spark plugs 6 and the fuel injection valves 7 are electrically connected to the ECU 2, and a fuel injection amount and fuel injection timing of fuel injected from each fuel injection valve 7, and an ignition timing in which a mixture is ignited by each spark plug 6 are controlled by the ECU 2. That is, fuel injection control and ignition timing control are executed.

The crank angle sensor 30 (time period parameter-obtaining means) delivers a CRK signal and a TDC signal, which are both pulse signals, to the ECU 2 along with rotation of the crankshaft 3c. Each pulse of the CRK signal is generated whenever the crankshaft 3c rotates through a predetermined crank angle (e.g. 1°). The ECU 2 calculates a rotational speed NE of the engine 3 (hereinafter referred to as "the engine speed NE") based on the CRK signal. Further, the TDC signal indicates that the piston 3b in one of the cylinders 3a is in a predetermined crank angle position slightly before the TDC position of the intake stroke, and each pulse thereof is delivered whenever the crankshaft rotates through 180°, in the case of the four-cylinder engine 3 of the present embodiment.

On the other hand, the turbocharger 40 comprises a compressor blade 41 housed in a compressor housing, not shown, provided at an intermediate portion of the intake passage 8, a turbine blade 42 housed in a turbine housing, not shown, provided at an intermediate portion of the exhaust passage 9, a shaft 43 integrally connecting the two blades 41 and 42, and a waste gate valve 44.

In the turbocharger 40, as the turbine blade 42 is driven for rotation by exhaust gases flowing through the intake passage 9, the compressor blade 41 provided integrally with the turbine blade 42 is rotated along with rotation of the turbine blade 42, whereby intake air within the intake passage 8 is compressed, that is, a supercharging operation is performed.

The waste gate valve 44 opens and closes a bypass exhaust passage 9a which bypasses the turbine blade 42 in the exhaust passage 9, and is implemented by an electromagnetic control valve which is electrically connected to the ECU 2. The waste gate valve 44 has its valve opening degree changed according to a control input signal from the ECU 2, to thereby change the flow rate of exhaust gases flowing through the bypass exhaust passage 9a, i.e. the flow rate of exhaust gases for driving the turbine blade 42. This controls the supercharging operation of the turbocharger 40.

Further, an air flow sensor 31, an intake pressure sensor 32, an intake air temperature sensor 33, an exhaust pressure sensor 34, an exhaust gas temperature sensor 35, an intake cam angle sensor 36, and an exhaust cam angle sensor 37 are electrically connected to the ECU 2. The air flow sensor 31 detects the flow rate of fresh air flowing through the intake passage 8, and delivers a signal indicative of the detected flow rate of fresh air to the ECU 2. The ECU 2 calculates an intake air amount GAIR (a value indicative of an operating condition of the engine) based on the detection signal from the air flow sensor 31.

The intake pressure sensor 32 (intake pressure parameter-obtaining means) detects a pressure Pin within the intake passage 8 (hereafter referred to as the "intake pressure Pin"), and delivers a signal indicative of the detected intake pressure Pin to the ECU 2. The intake pressure Pin is detected as an absolute pressure. Further, the intake air temperature sensor 33 detects a temperature Tin of air within the intake passage 8 (hereafter referred to as the "intake air temperature Tin"), and delivers a signal indicative of the detected intake air temperature Tin to the ECU 2. The intake air temperature Tin is detected as an absolute temperature.

On the other hand, the exhaust pressure sensor 34 (exhaust pressure parameter-obtaining means) detects a pressure Pex within the exhaust passage 9 (hereinafter referred to as the "exhaust pressure Pex"), and delivers a signal indicative of the detected exhaust pressure Pex to the ECU 2. The exhaust pressure Pex is detected as an absolute pressure. Further, the exhaust gas temperature sensor 35 detects a temperature Tex of exhaust gases flowing through the exhaust passage 9 (hereinafter referred to as the "exhaust gas temperature Tex"), and delivers a signal indicative of the detected exhaust gas temperature Tex to the ECU 2. The exhaust gas temperature Tex is detected as an absolute temperature.

Further, the intake cam angle sensor 36 (time period parameter-obtaining means) is disposed at an end of the intake cam shaft 11 on a side thereof remote from the variable intake cam phase mechanism 12, and delivers an intake cam signal, which is a pulse signal, to the ECU 2 along with rotation of the intake cam shaft 11 whenever the intake cam shaft 11 rotates through a predetermined cam angle (e.g. 1°). The ECU 2 calculates the intake cam phase CAIN based on the intake cam signal and the above-mentioned CRK signal.

Further, the exhaust cam angle sensor 37 (time period parameter-obtaining means) is disposed at an end of the exhaust cam shaft 21 on a side thereof remote from the variable exhaust cam phase mechanism 22, and delivers an exhaust cam signal, which is a pulse signal, to the ECU 2 along with rotation of the exhaust cam shaft 21 whenever the exhaust cam shaft 21 rotates through a predetermined cam angle (e.g. 1°). The ECU 2 calculates the exhaust cam phase CAEX based on the exhaust cam signal and the above-described CRK signal.

The ECU 2 is implemented by a microcomputer comprising a CPU, a RAM, a ROM, and an I/O interface (none of which are specifically shown). Further, the ECU 2 executes a process for calculating an internal EGR amount based on the detection signals from the aforementioned sensors 30 to 37, as described hereinafter, and controls the operations of the spark plugs 6, the fuel injection valves 7, the intake cam phase control valve 12a, the exhaust cam phase control valve 22a, and the waste gate valve 44.

Note that in the present embodiment, the ECU 2 corresponds to the intake pressure parameter-obtaining means, the exhaust pressure parameter-obtaining means, the time period parameter-obtaining means, scavenged gas amount-calculating means, scavenged gas production degree parameter-calculating means, minimum exhaust pressure-calculating means, average exhaust pressure-calculating means, minimum amplitude-calculating means, blown-back gas amount-calculating means, corrected blown-back gas amount-calculating means, internal EGR amount-calculating means, maximum exhaust pressure-calculating means, blown-back gas production degree-calculating means, and maximum amplitude-calculating means.

Hereafter, a description will be given of the principles and viewpoints of a method of calculation of the internal EGR amount, performed by the internal EGR amount calculation device 1 according to the embodiment. First, the relationship between the length of the valve overlap time period and the stream of gases through the cylinder 3a will be described with reference to FIG. 3A, 3B to FIG. 5A, 5B. Operation examples shown in FIGS. 3A and 3B to FIGS. 5A and 5B are those in which the supercharging operation is executed by the abovementioned turbocharger 40.

Figure 2:
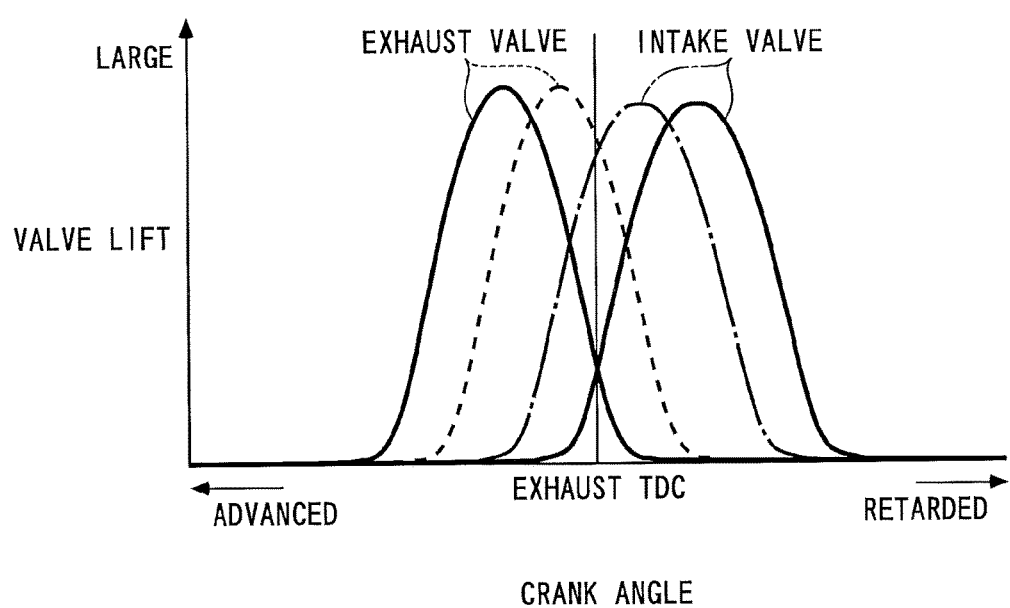
FIG. 2 is a diagram of valve lift curves showing changes in valve timings of an intake valve and an exhaust valve caused by a variable intake cam phase mechanism and a variable exhaust cam phase mechanism.
Figure 3A:
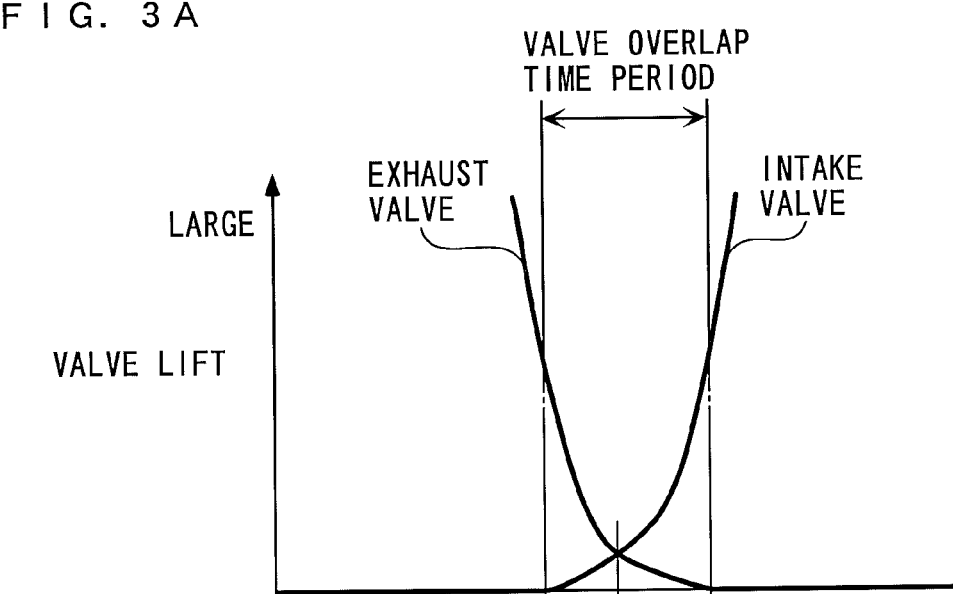
FIG. 3A is a diagram showing valve lift curves obtained during and before and after a valve overlap time period when CAIN=CAEX=0 hold.
Figure 3B:
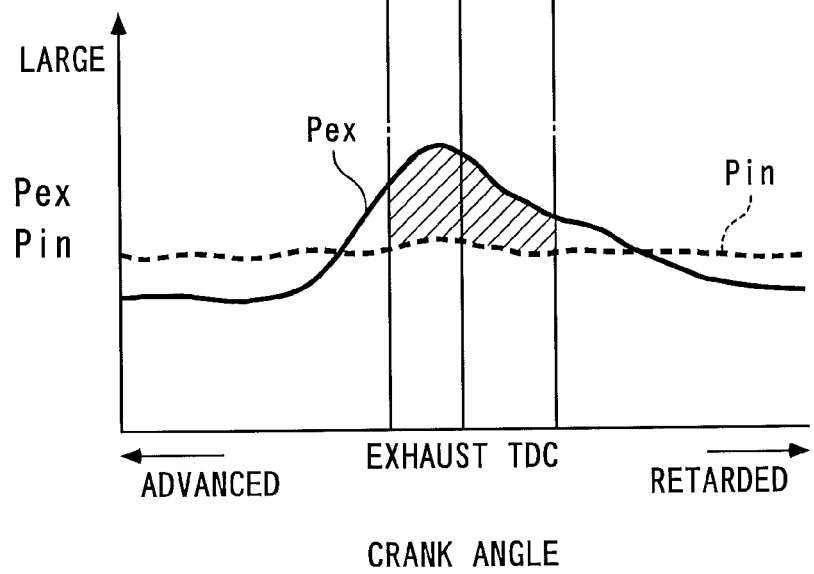
FIG. 3B is a diagram showing an example of a result of measurement of the intake pressure and the exhaust pressure obtained during and before and after the valve overlap time when CAIN=CAEX=0 holds.

First, as shown in FIG. 3A, when CAIN=CAEX=0 is set, that is, when both of the intake valve timing and the exhaust valve timing are set to respective reference timings indicated by solid lines in FIG. 2, the exhaust pressure Pex exceeds the intake pressure Pin throughout an entire region during the valve overlap time period, as shown in FIG. 3B, and due to this, the above-mentioned scavenged gases are not produced, and the above-mentioned blown-back gases are produced. In this case, a hatched region in FIG. 3B represents a region where blown-back gases are produced.

Figure 4A:
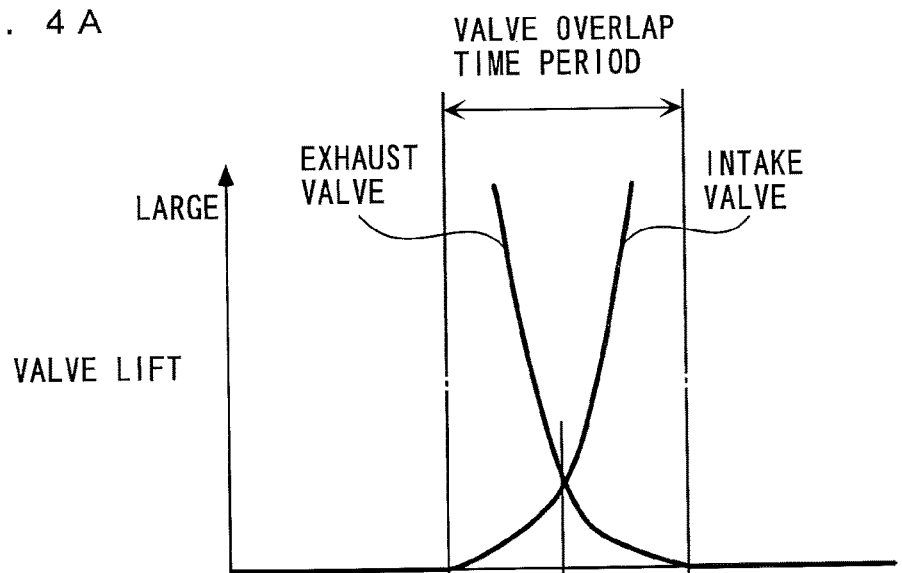
FIG. 4A is a diagram showing valve lift curves obtained during and before and after the valve overlap time period when CAIN=CAEX=CAREF holds.

Next, a case will be described in which CAIN=CAEX=CAREF is set as shown in FIG. 4A. The value CAREF is a predetermined value which satisfies 0<CAREF<CAIN_rt and 0<CAREF<CAEX_ad, and accordingly, in the case of an operation example shown in FIG. 4A, the intake valve timing is set to a more advanced timing than its reference timing by the amount of the predetermined value CAREF and the exhaust valve timing is set to a more retarded timing than the its reference timing by the amount of the predetermined value CAREF, whereby the valve overlap time period becomes longer than the case shown in FIGS. 3A and 3B.

Figure 4B:
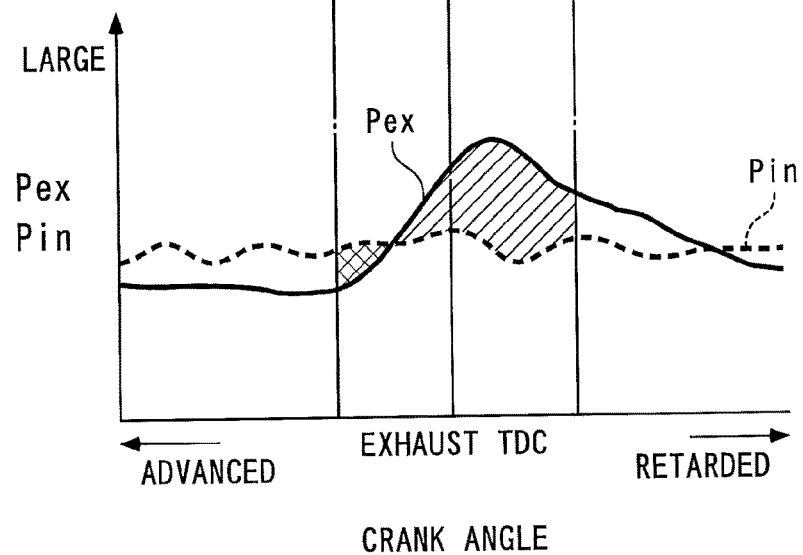
FIG. 4B is a diagram showing an example of a result of measurement of the intake pressure and the exhaust pressure obtained during and before and after the valve overlap time when CAIN=CAEX=CAREF holds.

Accordingly, as shown in FIG. 4B, until a midpoint of the first half of the valve overlap time period is reached, Pex<Pin is satisfied, whereby scavenged gases are produced, and after Pex>Pin is satisfied, blown-back gases are produced. In this case, a cross-hatched area in FIG. 4B represents a region where the scavenged gases are produced. In the case where the scavenged gases and the blown-back gases are thus produced, the internal EGR amount is reduced by the amount of the scavenged gases.

Figure 5A:
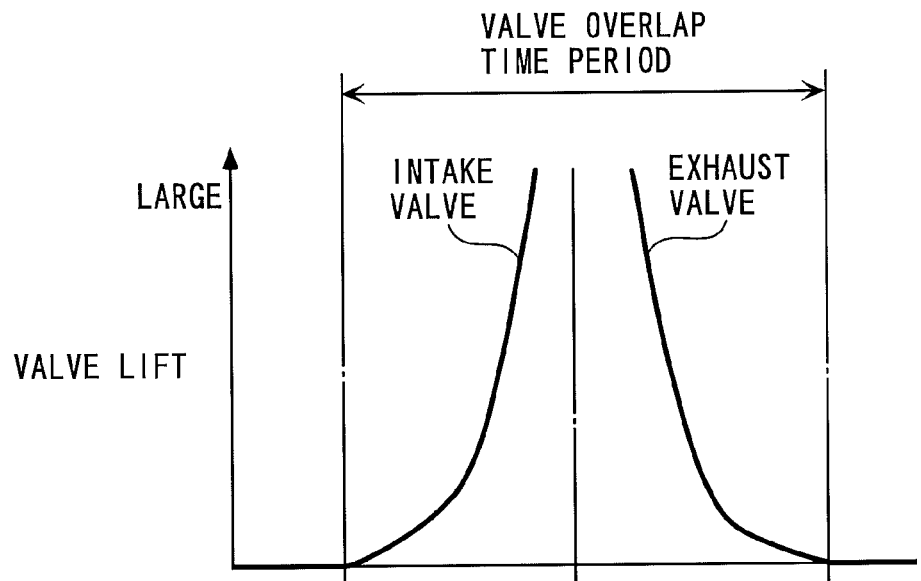
FIG. 5A is a diagram showing valve lift curves obtained during and before and after the valve overlap time period when CAIN=CAIN_ad and CAEX=CAEX_rt hold.
Figure 5B:
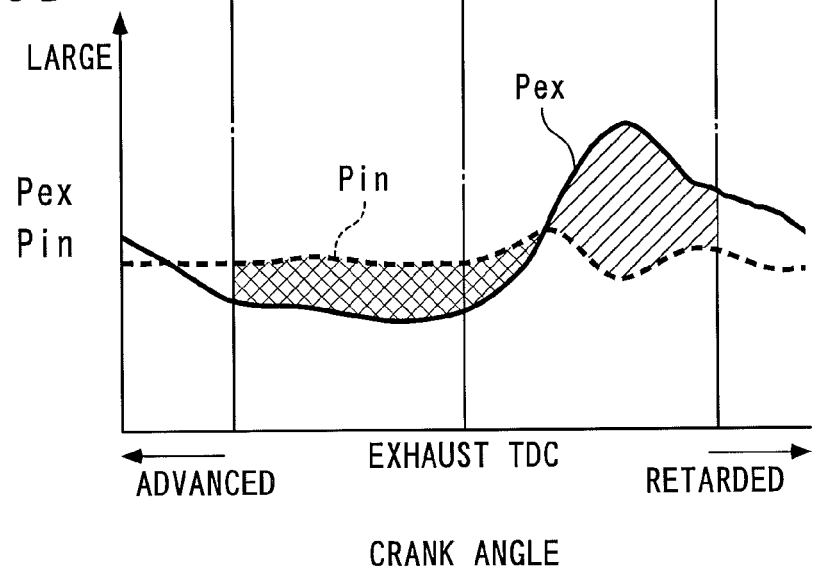
FIG. 5B is a diagram showing an example of a result of measurement of the intake pressure and the exhaust pressure obtained during and before and after the valve overlap time when CAIN=CAIN_ad and CAEX=CAEX_rt hold.

Further, as shown in FIG. 5A, when CAIN=CAIN_ad and CAEX=CAEX_rt are set, the valve overlap time period becomes the longest, and accordingly, as shown in FIG. 5B, until a midpoint of the second half of the valve overlap time period is reached, Pex<Pin is satisfied, whereby scavenged gases are produced, and after Pex>Pin is satisfied, blown-back gases are produced. In a case where the scavenged gases and the blown-back gases are thus produced as well, the internal EGR amount is reduced by the amount of the scavenged gases.

As described above, according to the change of the length of the valve overlap time period, a ratio between the blown-back gas amount and the scavenged gas amount changes. Specifically, as the valve overlap time period is longer, the blown-back gas amount decreases and the scavenged gas amount increases.

Here, the measurement of the blown-back gas amount based on the exhaust flow rate gave measurement results shown in FIG. 6. In FIG. 6, an overlap angle OVL (time period parameter) on the horizontal axis is the sum of the intake cam phase CAIN and the exhaust cam phase CAEX, and a value OVLref is a predetermined value of the overlap angle OVL which is larger than 0. Further, a value OVLmax is the maximum value of the overlap angle OVL in which OVLmax=CAIN_ad+CAEX_rt holds. In this case, since the intake cam phase CAIN and the exhaust cam phase CAEX are set as described hereinabove, the overlap angle OVL is calculated as a larger value as the valve overlap time period is longer.

As shown in FIG. 6, the blown-back gas amount has a positive value in a region of OVL<OVLref, and has a negative value in a region of OVLref<OVL≤OVLmax. As described hereinabove, if the overlap angle OVL is large, that is, if the valve overlap time period is long, the blown-back gas amount decreases and the scavenged gas amount increases, and hence, it is presumed that due to this, there occurs a state in which the scavenged gas amount exceeds the blown-back gas amount, in the region of OVLref<OVL≤OVLmax.

For the above-described reasons, in the embodiment, the blown-back gas amount GegrRV is calculated, as shown in the following equation (1), by adding a correction term dGegr_OVL to a value calculated by subtracting a scavenged gas amount GegrSca from a basic blown-back gas amount GegrRV_Base.

$$GegrRV = GegrRV\_Base - GegrSca + dGegr\_OVL \quad (1)$$

As shown in the above equation (1), the blown-back gas amount GegrRV is calculated by correcting the basic blown-back gas amount GegrRV_Base by the scavenged gas amount GegrSca. In the embodiment, the blown-back gas amount GegrRV corresponds to a corrected blown-back gas amount and the basic blown-back gas amount GegrRV_Base corresponds to a blown-back gas amount. Further, the meaning and calculation method of the correction term dGegr_OVL will be described hereinafter.

The basic blown-back gas amount GegrRV_Base in the above equation (1) is a value corresponding to the blown-back gas amount when CAIN=CAEX=0, that is, when the overlap angle OVL=0, and is calculated by the following equations (2) to (4). The following equations (2) to (4) are derived using a nozzle equation by regarding blown-back gases (i.e. burned gases) as an adiabatic flow of compressible fluid and at the same time regarding a path through which the blown-back gases flow as a nozzle. A method of deriving the equations (2) to (4) is the same as one described e.g. in Japanese Laid-Open Patent Publication (Kokai) No. 2011-140895 by the present assignee, and hence description thereof is omitted.

$$GegrRv\_Base = CdA \cdot \frac{PexMax}{\sqrt{Re \cdot Tex}} \cdot \Psi \cdot Krv \quad (2)$$

$$\text{WHEN } \frac{PinAve}{PexMAX} > \left(\frac{2}{\kappa+1}\right)^{\frac{\kappa}{\kappa-1}}$$

$$\Psi = \sqrt{\frac{2\kappa}{\kappa-1}\left\{\left(\frac{PinAve}{PexMax}\right)^{\frac{2}{\kappa}} - \left(\frac{PinAve}{PexMax}\right)^{\frac{\kappa+1}{\kappa}}\right\}} \quad (3)$$

$$\text{WHEN } \frac{PinAve}{PexMAX} \leq \left(\frac{2}{\kappa+1}\right)^{\frac{\kappa}{\kappa-1}}$$

$$\Psi = \sqrt{\kappa\left(\frac{2}{\kappa+1}\right)^{\frac{\kappa+1}{\kappa-1}}} \quad (4)$$

In the equation (2), PexMAX represents a maximum exhaust pressure, CdA represents a function value, PinAve represents an average intake pressure, Re represents a gas constant, $\Psi$ represents a flow function, and Krv represents a correction coefficient, and in the equations (3) and (4), $\kappa$ represents a specific heat ratio. The maximum exhaust pressure PexMAX (exhaust pressure parameter) is an estimated maximum value of the exhaust pressure Pex during the valve overlap time period, and is calculated by a method, described hereinafter.

The reason for calculating the basic blown-back gas amount GegrRV_Base by using the such maximum exhaust pressure PexMAX is as follows: As is clear by reference to the above-described FIG. 3B to FIG. 5B, the blown-back gases are produced in the hatched region during the valve overlap time period, that is, the region in which the exhaust pressure Pex exceeds the intake pressure Pin, and hence the blown-back gas amount has characteristics that it is highly correlated with the maximum exhaust pressure PexMAX which is a maximum value of the exhaust pressure Pex during the valve overlap time period. Accordingly, in the embodiment, the basic blown-back gas amount GegrRV_Base is calculated by using the such maximum pressure PexMAX.

Further, the function value CdA is a value corresponding to the product of an effective opening area and a flow coefficient, and is calculated according to the overlap angle OVL by a method, described hereinafter. Further, the average intake pressure PinAve (intake pressure parameter) is a moving average value of the intake pressure Pin, and is calculated as described hereinafter.

Further, the correction coefficient Krv is calculated, according to the engine speed NE and the overlap angle OVL, by a method, described hereinafter. The reason for calculating the basic blown-back gas amount GegrRV_Base by using the such correction coefficient Krv are as follows: As explained hereinabove, the basic blown-back gas amount changes according to the change of the length of the valve overlap time period, and in addition to that, the basic blown-back gas amount also changes according to the change of the engine speed NE, and hence the correction coefficient Krv is used so as to cause influences of these changes to be reflected on the calculation result of the basic blown-back gas amount GegrRV_Base.

On the other hand, the above-mentioned scavenged gas amount GegrSca is calculated by the following equations (5) and (6) based on the equation of state of gas.

$$GegrScaALL = \frac{(PinAve - PexMin) \cdot Vcyl}{Re \cdot Tex} \quad (5)$$

$$GegrSca = GegrScaALL \cdot R\_Sca \quad (6)$$

In the above equation (5), GegrScaALL represents a total scavenged gas amount, PexMIN represents a minimum exhaust pressure, and Vcyl represents an in-cylinder volume, and in the equation (6), R_Sca represents a scavenge ratio. The total scavenged gas amount GegrScaALL is the total amount of the scavenged gases which are estimated to be produced when Pin>Pex is satisfied irrespective of whether during the valve overlap time period. Further, the minimum exhaust pressure PexMIN (exhaust pressure parameter) is an estimated minimum value of the exhaust pressure Pex during the valve overlap time period, and is calculated by a method, described hereinafter.

As shown in the above equation (5), in the calculation of the total scavenged gas amount GegrScaALL, the differential pressure between the average intake pressure PinAve and the minimum exhaust pressure PexMIN is used. The reason for this is follows: As is clear by reference to the above-mentioned FIG. 4B and FIG. 5B, the scavenged gases are produced in the cross-hatched region during the valve overlap time period, i.e. the region in which the exhaust pressure Pex is below the intake pressure Pin, and hence the scavenged gas amount has characteristics that it is highly correlated with the differential pressure between the intake pressure Pin and the minimum exhaust pressure PexMIN which is a minimum value of the exhaust pressure Pex during the valve overlap time period. Accordingly, in the embodiment, the total scavenged gas amount GegrScaALL is calculated by using the differential pressure between the average intake pressure PinAve and the minimum exhaust pressure PexMIN. Further, the in-cylinder volume Vcyl in the equation (5) represents a volumetric capacity of the cylinder $3a$ at a valve-opening timing of the intake valve 4, and is calculated by a method, described hereinafter.

Further, the scavenge ratio R_Sca in the equation (6) is a value representing a ratio of the amount of scavenged gases produced during the valve overlap time period to the total scavenged gas amount GegrScaALL, and is calculated according to the engine speed NE and the overlap angle OVL by a method, described hereinafter. Further, as shown in the above equation (6), the scavenged gas amount GegrSca is calculated by multiplying the total scavenged gas amount GegrScaALL by the scavenge ratio R_Sca. The reason for this is as follows:

The total scavenged gas amount GegrScaALL is the amount of scavenged gases which are estimated to be produced when Pin>Pex is satisfied irrespective of whether during the valve overlap time period. Actually, however, as is clear by reference to the above-mentioned FIG. 3B to FIG. 5 B, the scavenged gases are produced only in the region where Pin>Pex is satisfied during the valve overlap time period. Therefore, in order to reflect a ratio of a region where the scavenged gases are actually produced during the valve overlap time period to an entire region where Pin>Pex is satisfied, in the embodiment, the scavenged gas amount GegrSca is calculated by multiplying the total scavenged gas amount GegrScaALL by the scavenge ratio R_Sca.

Figure 7:
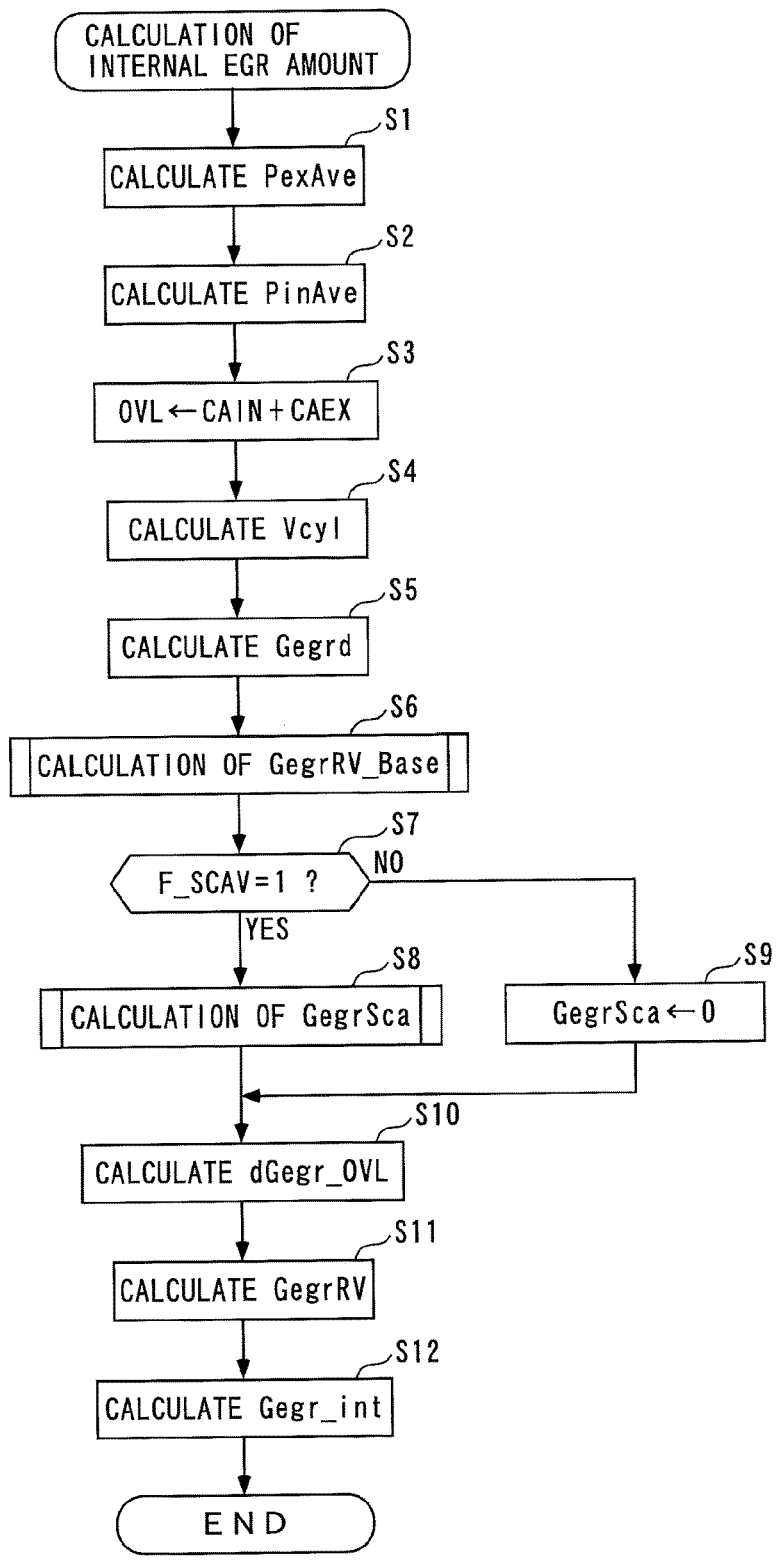
FIG. 7 is a flowchart showing a process for calculating an internal EGR amount.

Based on the above-described principles and viewpoints, in the internal EGR amount calculation device 1 according to the embodiment, a process for calculating the internal EGR amount is carried out as shown in FIG. 7. This calculation process is carried out, specifically, by the ECU 2 at a repetition period synchronous with the timing of generation of the TDC signal.

Referring to FIG. 7, first, in a step 1 (shown as S1 in abbreviated form in FIG. 7; the following steps are also shown in abbreviated form), the average exhaust pressure PexAve is calculated. The average exhaust pressure PexAve is calculated, specifically, as a moving average value of the current value and the preceding three time-series values including the immediately preceding value of the exhaust pressure Pex. That is, the average exhaust pressure PexAve is calculated as a moving average value of four time-series data items (i.e. data items of one combustion cycle) of the exhaust pressure Pex sampled in synchronism with the timing of generation of the TDC signal.

Next, the process proceeds to a step 2, wherein the average intake pressure PinAve is calculated. The average intake pressure PinAve is calculated, specifically, as a moving average value of the current value and the preceding three time-series values including the immediately preceding value of the intake pressure Pin. That is, the average intake pressure PinAve is calculated as a moving average value of four time-series data items (i.e. data items of one combustion cycle) of the intake pressure Pin sampled in synchronism with the timing of generation of the TDC signal.

Next, in a step 3, the overlap angle OVL is set to the sum (CAIN+CAEX) of the intake cam phase CAIN and the exhaust cam phase CAEX.

In a step 4 following the step 3, the in-cylinder volume Vcyl is calculated by searching a map, not shown, according to the intake cam phase CAIN.

Next, the process proceeds to a step 5, wherein a residual gas amount Gegrd is calculated by the following equation (7). The residual gas amount Gegrd corresponds to an amount of burned gases remaining within the cylinder $3a$ immediately before opening the intake valve 4.

$$Gegrd = \frac{PexAve \cdot Vcyl}{Re \cdot Tex} \quad (7)$$

Figure 8:
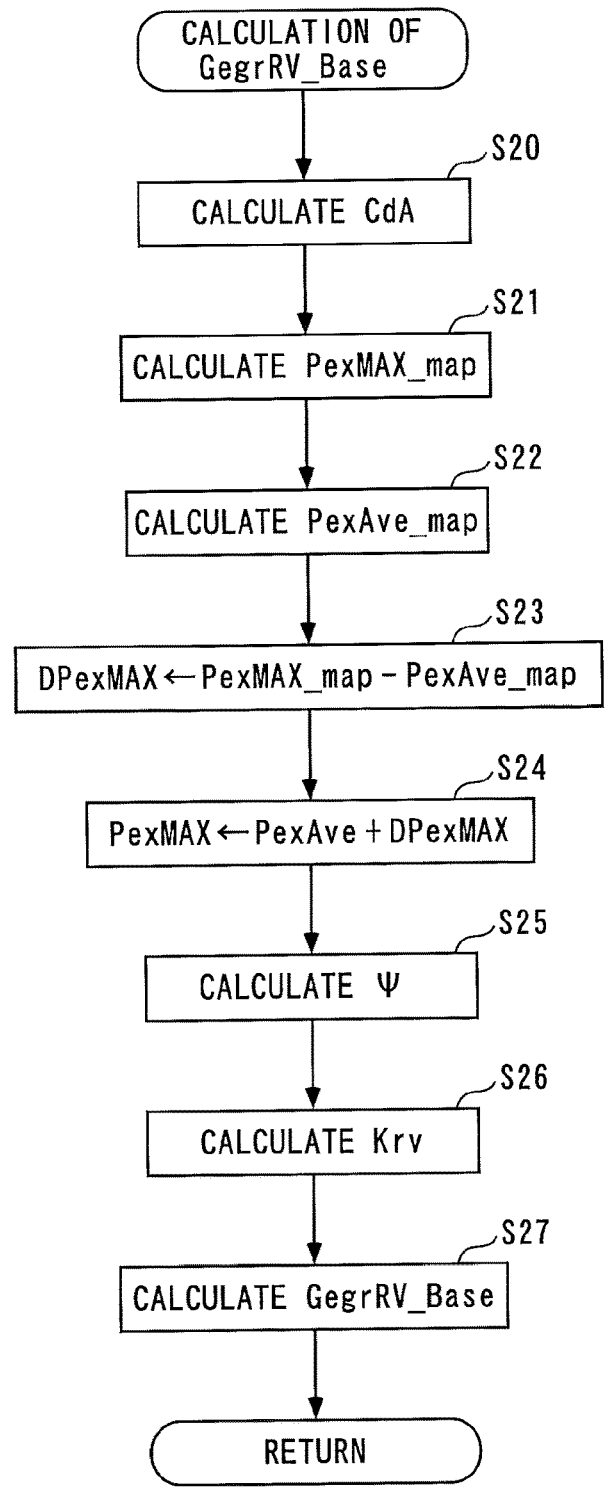
FIG. 8 is a flowchart showing a process for calculating a basic blown-back gas amount.
Figure 9:
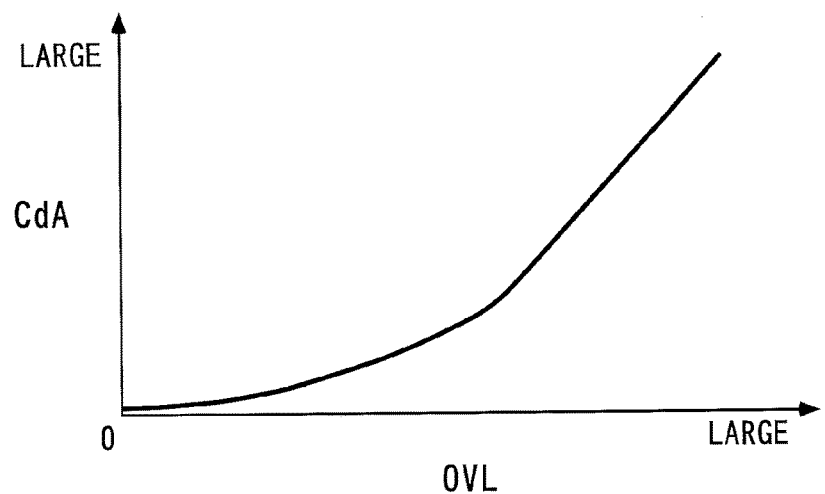
FIG. 9 is a diagram showing an example of a map for use in calculating a function value.

Next, in a step 6, the basic blown-back gas amount GegrRV_Base is calculated. A process for calculating the basic blown-back gas amount GegrRV_Base is executed, specifically, as shown in FIG. 8. Referring to FIG. 8, first, in a step 20, the function value CdA is calculated by searching a map shown in FIG. 9 according to the overlap angle OVL.

Figure 10:
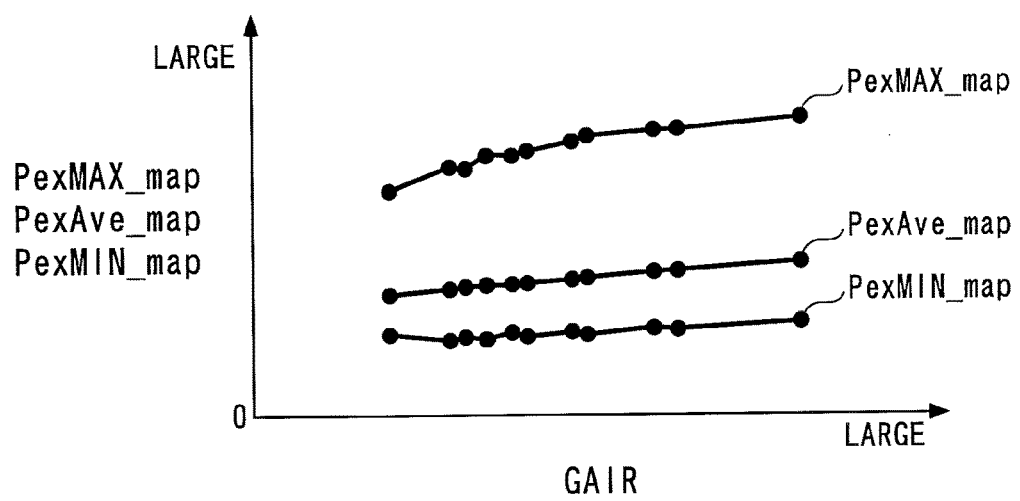
FIG. 10 is a diagram showing an example of a map for use in calculating a map value of a maximum exhaust pressure, a map value of an average exhaust pressure, and a map value of a minimum exhaust pressure.

Next, the process proceeds to a step 21, wherein a map value PexMAX_map of the maximum exhaust pressure is calculated by searching a map shown in FIG. 10 according to the intake air amount GAIR.

In a step 22 following the step 21, a map value PexAve_map of the average exhaust pressure is calculated by searching the map shown in FIG. 10 according to the intake air amount GAIR.

Next, the process proceeds to a step 23, wherein a maximum amplitude DPexMAX is set to a difference (PexMAX_map−PexAve_map) between the map value PexMAX_map of the maximum exhaust pressure and the map value PexAve_map of the average exhaust pressure.

Next, in a step 24, the maximum exhaust pressure PexMAX is set to the sum (PexAve+DPexMAX) of the average exhaust pressure PexAve and the maximum amplitude DPexMAX.

In a step 25 following the step 24, the flow function Ψ is calculated by the above-mentioned equations (3) and (4).

Next, the process proceeds to a step 26, wherein the correction coefficient Krv is calculated by searching a map shown in FIG. 11 according to the overlap angle OVL and the engine speed NE. In FIG. 11, OVL1 to OVLi (i is a positive integer) are predetermined values of the overlap angle OVL in which OVL1< . . . <OVLi is satisfied, and NE1 to NEj (j is a positive integer) are predetermined values of the engine speed NE in which NE1< . . . <NEj is satisfied. In this map, the correction coefficient Krv (blown-back gas production degree parameter) is set to a smaller value as the overlap angle OVL is larger. This is because, as explained hereinbefore, as the overlap angle OVL increases, that is, as the overlap time period is longer, the blown-back gas amount decreases.

Then, finally, in a step 27, the basic blown-back gas amount GegrRV_Base is calculated by the above-mentioned equation (2), followed by terminating the present process.

Referring again to FIG. 7, after the basic blown-back gas amount GegrRV_Base is calculated in the step 6 as described above, the process proceeds to a step 7, wherein it is determined whether or not a scavenging judgment flag F_SCAV is equal to 1. In a judgment process, not shown, the scavenging judgment flag F_SCAV is set to 1 under a condition where the scavenged gases are produced, and is set to 0 under a condition where the scavenged gases are not produced. Specifically, in the case of the engine 3 of the embodiment, during execution of the supercharging operation by the turbocharger 40, or during high-load operation, F_SCAV=1 is set.

If the answer to the question of the step 7 is affirmative (YES), i.e. if under the condition where the scavenged gases are produced, the process proceeds to a step 8, wherein the scavenged gas amount GegrSca is calculated. A process for calculating the scavenged gas amount GegrSca is executed, specifically, as shown in FIG. 12. Referring to FIG. 12, first, in a step 30, a map value PexMIN_map of the minimum exhaust pressure is calculated by searching the above-mentioned map shown in FIG. 10 according to the intake air amount GAIR.

Next, the process proceeds to a step 31, wherein a minimum amplitude DPexMIN is set to a difference (PexAve_map−PexMIN_map) between the map value PexAve_map of the average exhaust pressure and the map value PexMIN_map of the minimum exhaust pressure.

Next, in a step 32, the minimum exhaust pressure PexMIN is set to a difference (PexAve−DPexMIN) between the average exhaust pressure PexAve and the minimum amplitude DPexMIN.

In a step 33 following the step 32, the total scavenged gas amount GegrScaALL is calculated by the above-mentioned equation (5).

Next, the process proceeds to a step 34, wherein the scavenge ratio R_Sca is calculated by searching a map shown in FIG. 13 according to the overlap angle OVL and the engine speed NE. In this map, the scavenge ratio R_Sca (scavenged gas production degree parameter) is set to a larger value as the overlap angle OVL is larger. This is because, as explained hereinabove, as the overlap angle OVL increases, that is, as the valve overlap time period is longer, the scavenged gas amount increases.

Then, finally, in a step 35, the scavenged gas amount GegrSca is calculated by the above-mentioned equation (6), followed by terminating the present process.

Referring again to FIG. 7, after the scavenged gas amount GegrSca is calculated in the step 8 as described above, the process proceeds to a step 10, referred to hereinafter.

On the other hand, if the answer to the question of the step 7 is negative (NO), i.e. if under the condition where scavenged gases are not produced, the process proceeds to a step 9, wherein the scavenged gas amount GegrSca is set to 0, and then the process proceeds to the step 10.

In the step 10 following the above step 8 or 9, the correction term dGegr_OVL is calculated. The correction term dGegr_OVL is for correcting a change of the blown-back gas amount GegrRV caused by the change of the overlap angle OVL, and, though not shown, is calculated, specifically, as described hereafter.

First, the correction coefficient KGegr is calculated by searching a map, not shown, according to the overlap angle OVL and the intake air amount GAIR. Further, an overlap center position OVL_Center is calculated based on the exhaust cam phase CAEX and the intake cam phase CAIN. The overlap center position OVL_Center corresponds to a crank angle position at a center between the start point and end point of the valve overlap time period. Then, the correction term dGegr_OVL is calculated by multiplying the overlap center position OVL_Center by the correction coefficient KGegr.

After the correction term dGegr_OVL is calculated in the step 10 as described above, the process proceeds to a step 11, wherein the blown-back gas amount GegrRV is calculated by the above-mentioned equation (1).

Next, the process proceeds to a step 12, wherein the internal EGR amount Gegr_int is calculated by the following equation (8), followed by terminating the present process. That is, the internal EGR amount Gegr_int is calculated as the sum of the residual gas amount Gegrd and the blown-back gas amount GegrRV.

$$Gegr\_int = Gegrd + GegrRV \qquad (8)$$

Figure 14:
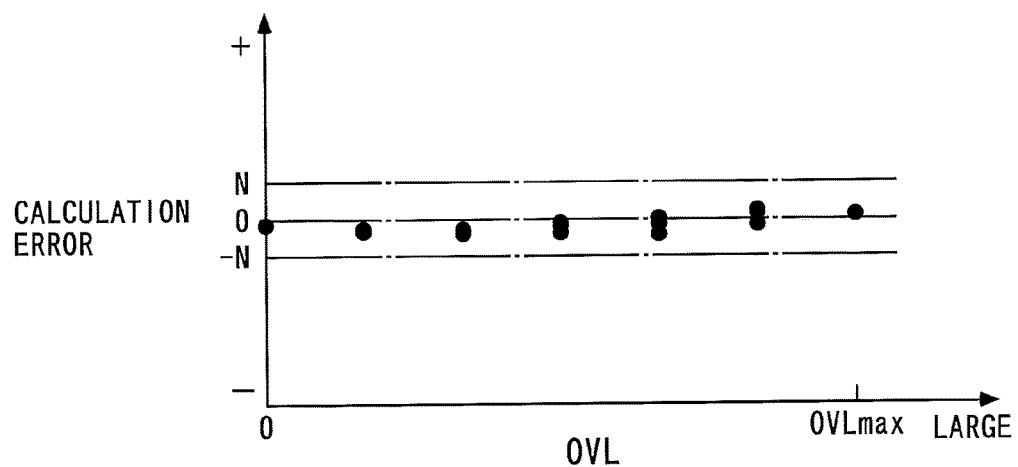
FIG. 14 is a diagram showing an example of a calculation error caused in a case where the internal EGR amount is calculated by a method of the present invention.
Figure 15:
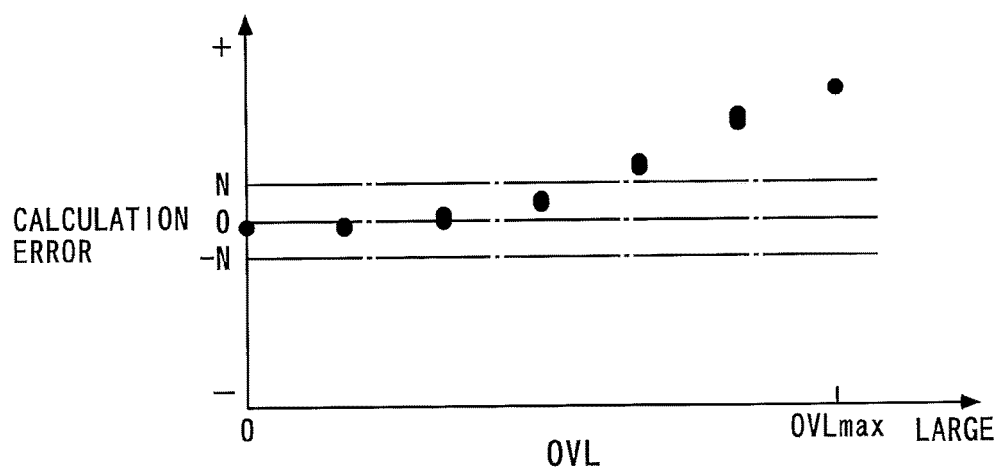
FIG. 15 is a diagram showing, for comparison, an example of a calculation error caused when the internal EGR amount is calculated in a case where a scavenged gas amount=0 is set.

Next, the accuracy of the calculation result of the internal EGR amount Gegr_int according to the internal EGR amount calculation device 1 according to the embodiment will be explained with reference to FIGS. 14 and 15. FIG. 14 represents a relationship between a calculation error of the internal EGR amount Gegr_int by the internal EGR amount calculation device 1 according to the embodiment and the overlap angle OVL, and this calculation error expresses the difference between the result of calculation of the internal EGR amount Gegr_int and an actual value, as a percentage. Further, FIG. 15 shows, for comparison, the relationship between the calculation error of the internal EGR amount Gegr_int and the overlap angle OVL, caused when the scavenged gas amount GegrSca=0 and the blown-back gas amount GegrRV=GegrRV_Base+dGegr_OVL are set.

First, it is understood that when the internal EGR amount Gegr_int is calculated by using the scavenged gas amount GegrSca, as shown in FIG. 14, the calculation error is within a range of ±N % (N is an integer) irrespective of the magnitude of the overlap angle OVL. On the other hand, it is understood that when the internal EGR amount Gegr_int is calculated by setting the scavenged gas amount GegrSca=0, as shown in FIG. 15, the absolute value of the calculation error is larger than the value N, in a region where the overlap angle OVL is large, that is, in a region where the valve overlap time period is long, which means that the calculation accuracy is reduced. That is, as explained hereinabove, under the condition where the valve overlap time period is long and the scavenged gases are produced, if the scavenged gas amount GegrSca=0 is set, due to the production of scavenged gases, the calculation accuracy of the internal EGR amount Gegr_int is reduced. Therefore, it is understood that in calculating the internal EGR amount Gegr_int, by correcting the basic blown-back gas amount GegrRV_Base by the scavenged gas amount GegrSca, as in the present embodiment, it is possible to improve the calculation accuracy of the internal EGR amount Gegr_int when the valve overlap time period is long.

As described above, according to the internal EGR amount calculation device 1 of the embodiment, the scavenged gas amount GegrSca is calculated by using the average intake pressure PinAve, the minimum exhaust pressure PexMIN, and the scavenge ratio R_Sca, as shown in the above-mentioned equations (5) and (6). In this case, since the scavenge ratio R_Sca is calculated according to the overlap angle OVL, it is calculated as a value on which the length of the valve overlap time period is reflected. Further, as mentioned hereinabove, the minimum exhaust pressure PexMIN has characteristics that it is highly correlated with the scavenged gas amount during the valve overlap time period.

Therefore, by using the such minimum exhaust pressure PexMIN and scavenge ratio R_Sca, under the condition where the scavenged gases are produced during the valve overlap time period, the scavenge ratio gas amount GegrSca can be calculated while causing the length of the valve overlap time period and the minimum exhaust pressure PexMIN, which are highly correlated with the scavenged gas amount GegrSca, to be reflected thereon. This makes it possible to improve the calculation accuracy of the scavenged gas amount GegrSca.

Further, in the map for use in calculating the scavenged gas amount ratio R_Sca, shown in FIG. 13, the scavenge ratio R_Sca is set to a larger value as the overlap angle OVL is larger, that is, as the valve overlap time period is longer. Therefore, as the scavenged gases are more likely to be produced due to the valve overlap time period being long, the scavenged gas amount GegrSca can be calculated as a larger value accordingly. As a result, the calculation accuracy of the scavenged gas amount GegrSca can be further improved.

Further, the minimum exhaust pressure PexMIN is calculated as the difference (PexAve−DPexMIN) between the average exhaust pressure PexAve and the minimum amplitude DPexMIN, and the minimum amplitude DPexMIN is calculated as the difference (PexAve_map−PexMIN_map) of the map value PexAve_map of the average exhaust pressure and the map value PexMIN_map of the minimum exhaust pressure, and hence it is possible to reduce computational load compared with the case in which the exhaust pressure Pex is sampled successively at a very short sampling repetition period and the minimum exhaust pressure PexMIN is calculated based on results of the sampling.

Further, the blown-back gas amount GegrRV is calculated by correcting the basic blown-back gas amount Gegr-RV_Base by the scavenged gas amount GegrSca, and the internal EGR amount Gegr_int is calculated by adding the blown-back gas amount GegrRV to the residual gas amount Gegrd, and hence it is possible to calculate the internal EGR amount Gegr_int while causing the scavenged gas amount GegrSca to be reflected thereon. Accordingly, it is possible to improve the calculation accuracy of the internal EGR amount Gegr_int compared with the case described in Japanese Laid-Open Patent Publication (Kokai) No. 2004-251182 in which the scavenged gas amount GegrSca is not taken into account in calculating the internal EGR amount Gegr_int.

Further, the blown-back gases are produced under the condition that the exhaust pressure Pex exceeds the intake pressure Pin, and hence the blown-back gas amount is highly correlated with the maximum exhaust pressure PexMAX during the valve overlap time period. In view of this, the basic blown-back gas amount GegrRV_Base is calculated by the equations (2) to (4), using the maximum exhaust pressure PexMAX, the average intake pressure PinAve, the correction coefficient Krv, etc., and hence it is possible to calculate the basic blown-back gas amount GegrRV_Base with accuracy.

Further, the maximum exhaust pressure PexMAX is calculated as the sum (PexAve+DPexMAX) of the average exhaust pressure PexAve and the maximum amplitude DPexMAX, and the maximum amplitude DPexMAX is calculated as the difference (PexMAX_map−PexAve_map) between the map value PexMAX_map of the maximum exhaust pressure and the map value PexAve_map of the average exhaust pressure, and hence it is possible to reduce computational load compared with the case in which the exhaust pressure Pex is sampled successively at a very short sampling repetition period and the maximum exhaust pressure PexMAX is calculated based on results of the sampling.

Further, although in the above-described embodiment, the engine 3 including the variable intake cam phase mechanism 12 and the variable exhaust cam phase mechanism 22 is used as an internal combustion engine capable of changing the valve timing of at least one of each intake valve 4 and each exhaust valves 5, by way of example, the engine to which the present invention is applied is not limited to this, but any suitable engine may be employed insofar as it can change the valve timing of at least one of each intake valve and each exhaust valve. For example, as the engine 3, there may be employed an internal combustion engine including one of the variable intake cam phase mechanism 12 and the variable exhaust cam phase mechanism 22 or an internal combustion engine which changes the valve timing of at least one of each intake valve 4 and each exhaust valve 5 using a mechanism other than the variable intake cam phase mechanism 12 and the variable exhaust cam phase mechanism 22. For example, as a mechanism for changing the cam phase, there may be employed a variable cam phase mechanism formed by combining an electric motor and a gear mechanism, an electromagnetic valve-actuating mechanism which has a valve element actuated by a solenoid, or a valve timing changing mechanism for mechanically changing the valve timing using a three-dimensional cam.

Further, although in the above-described embodiment, the average intake pressure PinAve is used as the intake pressure parameter, the intake pressure parameter in the present invention is not limited to this, but any suitable intake pressure parameter may be used insofar as it represents the intake pressure. For example, as the intake pressure parameter, the average value of the intake pressure during the valve overlap time period may be used.

Further, although in the above-described embodiment, the average intake pressure PinAve is calculated as a moving average value of four time-series data items sampled in synchronism with the timing of generation of the TDC signal, the average intake pressure in the present invention is not limited to this, but any suitable average value of the intake pressure may be used. For example, the average intake pressure may be calculated as a moving average value of five or more time-series data items, or the average intake pressure may be calculated as a moving average value of the intake pressure sampled at a sampling repetition period different from the timing of generation of the TDC signal. Further, the average intake pressure may be calculated by an arithmetic average calculation method instead of the moving average calculation method.

On the other hand, although in the above-described embodiment, the minimum exhaust pressure PexMIN is used as the exhaust pressure parameter, by way of example, the exhaust pressure parameter in the present invention is not limited to this, but any suitable exhaust pressure parameter may be used insofar as it represents the pressure in the exhaust passage and enables accurate calculation of the scavenged gas amount. For example, as the exhaust pressure parameter, the average value of the exhaust pressure in a section corresponding to a predetermined crank angle close to the start point of the valve overlap time period may be used.

Further, although in the above-described embodiment, the maximum exhaust pressure PexMAX is used as the exhaust pressure parameter, the exhaust pressure parameter in the present invention is not limited to this, but any suitable exhaust pressure parameter may be used insofar as it represents the pressure in the exhaust passage and enables accurate calculation of the blown-back gas amount. For example, as the exhaust pressure parameter, the average value of the exhaust pressure in a section corresponding to a predetermined crank angle from a center or its vicinity of the valve overlap time period may be used.

Further, although in the above-described embodiment, the minimum exhaust pressure PexMIN is calculated by the method of subtracting the minimum amplitude DPexMIN calculated by map search from the average exhaust pressure PexAve, the method of calculating the minimum exhaust pressure PexMIN, in the present invention, is not limited to this, but any suitable method may be used insofar as it can calculate the minimum value of the exhaust pressure during the valve overlap time period according to a value indicative of an operating condition of the engine. For example, the minimum exhaust pressure PexMIN may be calculated directly by map search according to the value indicative of the operating condition of the engine.

Further, although in the above-described embodiment, the maximum exhaust pressure PexMAX is calculated by the method of subtracting the maximum amplitude DPexMAX calculated by map search from the average exhaust pressure PexAve, the method of calculating the maximum exhaust pressure PexMAX, in the present invention, is not limited to this, but any suitable method may be used insofar as it enables accurate calculation of the maximum value of the exhaust pressure during the valve overlap time period according to a value indicative of an operating condition of the engine. For example, the maximum exhaust pressure PexMAX may be calculated directly by map search according to the value indicative of the operating condition of the engine.

Further, although in the above-described embodiment, the average exhaust pressure PexAve is calculated as a moving average value of four time-series data items of the exhaust pressure Pex sampled in synchronism with the timing of generation of the TDC signal, the average exhaust pressure in the present invention is not limited to this, but any suitable average value of the exhaust pressure may be used. For example, the average exhaust pressure may be calculated as a moving average value of five or more time-series data items, or the average exhaust pressure may be calculated as a moving average value of the exhaust pressure sampled at a sampling repetition period different from the timing of generation of the TDC signal. Further, the average exhaust pressure may be calculated with an arithmetic average calculation method instead of the moving average calculation method.

On the other hand, although in the above-described embodiment, the overlap angle OVL is used as a time period parameter, the time period parameter according to the present invention is not limited to this, but any suitable time period parameter may be used insofar as it represents the length of the valve overlap time period. For example, a crank angle position at the timing of opening of the intake valve 4 and a crank angle position at the timing of closing of the exhaust valve 5 may be calculated, based on the intake cam phase CAIN and the exhaust cam phase CAEX, respectively, and the valve overlap time period calculated from these crank angle positions may be used as the time period parameter.

Further, although in the above-described embodiment, the scavenge ratio R_Sca is used as the scavenged gas production degree parameter, by way of example, the scavenged gas production degree parameter in the present invention is not limited to this, but any suitable scavenged gas production degree parameter may be used insofar as it represents the scavenged gas production degree during the valve overlap time period. For example, as the scavenged gas production degree parameter, a production ratio of the scavenged gases during the valve overlap time period calculated in percentage may be used.

Further, although in the above-described embodiment, the correction coefficient Krv is used as the blown-back gas production degree parameter, the blown-back gas production degree parameter in the present invention is not limited to this, but any suitable blown-back gas production degree parameter may be used insofar as it represents the blown-back gas production degree during the valve overlap time period. For example, as the blown-back gas production degree parameter, a production ratio of the blown-back gases during the valve overlap time period calculated in percentage may be used.

On the other hand, although in the above-described embodiment, the intake air amount GAIR is used as the value indicative of the operating condition of the engine, the value indicative of the operating condition of the engine, in the present invention, is not limited to this, but any suitable value may be used insofar as it represents the operating condition of the engine. For example, as the value indicative of the operating condition of the engine, the accelerator pedal opening or the coolant temperature of the engine may be used.

Further, although in the above-described embodiment, the scavenged gas amount calculation device and the internal EGR amount calculation device according to the present invention are applied to the engine for a vehicle, it goes without saying that the scavenged gas amount calculation device and the internal EGR amount calculation device according to the present invention are not limited to this, but can be applied to an internal combustion engine for boats and other industrial machines.

Further, although in the above-described embodiment, the scavenged gas amount calculation device and the internal EGR amount calculation device according to the present invention are applied to the engine equipped with the turbocharger, the scavenged gas amount calculation device and the internal EGR amount calculation device according to the present invention are not limited to this, but can be applied to an internal combustion engine with a mechanical supercharger and a naturally-aspirated internal combustion engine. In the case of the naturally-aspirated internal combustion engine, the scavenged gases are produced during high-load operation, and hence it is only required to configure the scavenged gas amount calculation device such that the scavenged gases are calculated during the such high-load operation.

It is further understood by those skilled in the art that the foregoing are preferred embodiments of the invention, and that various changes and modifications may be made without departing from the spirit and scope thereof.

What is claimed is:

1. A scavenged gas amount calculation device for an internal combustion engine in which a valve overlap time period of an intake valve and an exhaust valve of a cylinder is changed by changing valve timing of at least one of the intake valve and the exhaust valve, comprising:
  intake pressure parameter-obtaining means for obtaining an intake pressure parameter indicative of an intake pressure which is a pressure within an intake passage of the engine;
  exhaust pressure parameter-obtaining means for obtaining an exhaust pressure parameter indicative of an exhaust pressure which is a pressure within an exhaust passage of the engine;
  time period parameter-obtaining means for obtaining a time period parameter indicative of a length of the valve overlap time period; and
  scavenged gas amount-calculating means for calculating a scavenged gas amount which is an amount of gases scavenged from within the cylinder of the engine into the exhaust passage when the intake pressure is higher than the exhaust pressure during the valve overlap time period, according to the intake pressure parameter, the exhaust pressure parameter, and the time period parameter,
  wherein the scavenged gas amount is used to change the valve timing of at least one of the intake valve and the exhaust valve,
  wherein said exhaust pressure parameter-obtaining means includes minimum exhaust pressure-calculating means for calculating, as the exhaust pressure parameter, a minimum exhaust pressure which is a minimum value of the exhaust pressure during the valve overlap time period, according to a value indicative of an operating condition of the engine, and
  wherein said scavenged gas amount-calculating means includes scavenged gas production degree parameter-calculating means for calculating a scavenged gas production degree parameter indicative of a degree of production of the scavenged gases during the valve overlap time period, according to the time period parameter, and
  wherein the scavenged gas amount is calculated according to the scavenged gas production degree parameter, the intake pressure parameter, and the minimum exhaust pressure.

2. The scavenged gas amount calculation device as claimed in claim 1, wherein said minimum exhaust pressure-calculating means includes:
  average exhaust pressure-calculating means for calculating an average exhaust pressure which is an average value of the pressure within the exhaust passage over a predetermined time period; and
  minimum amplitude-calculating means for calculating a minimum amplitude for use in calculating the minimum exhaust pressure, according to the value indicative of the operating condition of the engine, and
  calculates the minimum exhaust pressure based on the average exhaust pressure and the minimum amplitude.

3. The scavenged gas amount calculation device as claimed in claim 1, wherein said scavenged gas amount-calculating means calculates the scavenged gas amount as a larger value as the valve overlap time period represented by the time period parameter is longer.

4. The scavenged gas amount calculation device as claimed claim 1, wherein said scavenged gas amount-calculating means calculates the scavenged gas amount as a larger value as the valve overlap time period represented by the time period parameter is longer.

5. The scavenged gas amount calculation device as claimed in claim 2, wherein said scavenged gas amount-calculating means calculates the scavenged gas amount as a larger value as the valve overlap time period represented by the time period parameter is longer.

6. An internal EGR amount calculation device for an internal combustion engine, comprising the scavenged gas amount calculation device as claimed in claim 1, and
  wherein the engine is configured to have an internal EGR amount thereof changed according to a change of the valve overlap time period,
  the internal EGR amount calculation device further comprising:
  blown-back gas amount-calculating means for calculating a blown-back gas amount which is an amount of gases which temporarily flow out of the cylinder into at least one of an intake system and an exhaust system and thereafter flow back into the cylinder again;
  corrected blown-back gas amount-calculating means for calculating a corrected blown-back gas amount by correcting the blown-back gas amount by the scavenged gas amount; and
  internal EGR amount-calculating means for calculating the internal EGR amount according to the corrected blown-back gas amount.

7. The internal EGR amount calculation device as claimed in claim 6, wherein said minimum exhaust pressure-calculating means includes:
  average exhaust pressure-calculating means for calculating an average exhaust pressure which is an average value of the pressure within the exhaust passage over a predetermined time period; and
  minimum amplitude-calculating means for calculating a minimum amplitude for use in calculating the minimum exhaust pressure, according to the value indicative of the operating condition of the engine, and
  calculates the minimum exhaust pressure based on the average exhaust pressure and the minimum amplitude.

8. The internal EGR amount calculation device as claimed in claim 6, wherein said scavenged gas amount-calculating means calculates the scavenged gas amount as a larger value as the valve overlap time period represented by the time period parameter is longer.

9. The internal EGR amount calculation device as claimed claim 6, wherein said scavenged gas amount-calculating means calculates the scavenged gas amount as a larger value as the valve overlap time period represented by the time period parameter is longer.

10. The internal EGR amount calculation device as claimed in claim 7, wherein said scavenged gas amount-calculating means calculates the scavenged gas amount as a larger value as the valve overlap time period represented by the time period parameter is longer.

11. The internal EGR amount calculation device as claimed in claim 6, wherein said exhaust pressure parameter-obtaining means includes maximum exhaust pressure-calculating means for calculating, as the exhaust pressure parameter, a maximum exhaust pressure which is a maximum value of the exhaust pressure during the valve overlap time period, according to the value indicative of the operating condition of the engine,
  wherein said blown-back gas amount-calculating means includes blown-back gas production degree parameter-calculating means calculating a blown-back gas production degree parameter indicative of a degree of production of the blown-back gases during the valve overlap time period, according to the time period parameter, and calculates the blown-back gas amount according to the blown-back gas production degree parameter, the intake pressure parameter, and the maximum exhaust pressure.

12. The internal EGR amount calculation device as claimed in claim 6, wherein said exhaust pressure parameter-obtaining means includes maximum exhaust pressure-calculating means for calculating, as the exhaust pressure parameter, a maximum exhaust pressure which is a maximum value of the exhaust pressure during the valve overlap time period, according to the value indicative of the operating condition of the engine, wherein said blown-back gas amount-calculating means includes blown-back gas production degree parameter-calculating means calculating a blown-back gas production degree parameter indicative of a degree of production of the blown-back gases during the valve overlap time period, according to the time period parameter, and calculates the blown-back gas amount according to the blown-back gas production degree parameter, the intake pressure parameter, and the maximum exhaust pressure.

13. The internal EGR amount calculation device as claimed in claim 7, wherein said exhaust pressure parameter-obtaining means includes maximum exhaust pressure-calculating means for calculating, as the exhaust pressure parameter, a maximum exhaust pressure which is a maximum value of the exhaust pressure during the valve overlap time period, according to the value indicative of the operating condition of the engine, wherein said blown-back gas amount-calculating means includes blown-back gas production degree parameter-calculating means calculating a blown-back gas production degree parameter indicative of a degree of production of the blown-back gases during the valve overlap time period, according to the time period parameter, and calculates the blown-back gas amount according to the blown-back gas production degree parameter, the intake pressure parameter, and the maximum exhaust pressure.

14. The internal EGR amount calculation device as claimed in claim 8, wherein said exhaust pressure parameter-obtaining means includes maximum exhaust pressure-calculating means for calculating, as the exhaust pressure parameter, a maximum exhaust pressure which is a maximum value of the exhaust pressure during the valve overlap time period, according to the value indicative of the operating condition of the engine, wherein said blown-back gas amount-calculating means includes blown-back gas production degree parameter-calculating means calculating a blown-back gas production degree parameter indicative of a degree of production of the blown-back gases during the valve overlap time period, according to the time period parameter, and calculates the blown-back gas amount according to the blown-back gas production degree parameter, the intake pressure parameter, and the maximum exhaust pressure.

15. The internal EGR amount calculation device as claimed in claim 9, wherein said exhaust pressure parameter-obtaining means includes maximum exhaust pressure-calculating means for calculating, as the exhaust pressure parameter, a maximum exhaust pressure which is a maximum value of the exhaust pressure during the valve overlap time period, according to the value indicative of the operating condition of the engine, wherein said blown-back gas amount-calculating means includes blown-back gas production degree parameter-calculating means calculating a blown-back gas production degree parameter indicative of a degree of production of the blown-back gases during the valve overlap time period, according to the time period parameter, and calculates the blown-back gas amount according to the blown-back gas production degree parameter, the intake pressure parameter, and the maximum exhaust pressure.

16. The internal EGR amount calculation device as claimed in claim 10, wherein said exhaust pressure parameter-obtaining means includes maximum exhaust pressure-calculating means for calculating, as the exhaust pressure parameter, a maximum exhaust pressure which is a maximum value of the exhaust pressure during the valve overlap time period, according to the value indicative of the operating condition of the engine, wherein said blown-back gas amount-calculating means includes blown-back gas production degree parameter-calculating means calculating a blown-back gas production degree parameter indicative of a degree of production of the blown-back gases during the valve overlap time period, according to the time period parameter, and calculates the blown-back gas amount according to the blown-back gas production degree parameter, the intake pressure parameter, and the maximum exhaust pressure.

17. The internal EGR amount calculation device as claimed in claim 11, wherein said maximum exhaust pressure-calculating means includes:

average exhaust pressure-calculating means for calculating an average exhaust pressure which is an average value of the pressure within the exhaust passage during a predetermined time period, and maximum amplitude-calculating means for calculating a maximum amplitude for use in calculating the maximum exhaust pressure, according to the value indicative of the operating condition of the engine, and calculates the maximum exhaust pressure according to the average exhaust pressure and the maximum amplitude.

18. The internal EGR amount calculation device as claimed in claim 12, wherein said maximum exhaust pressure-calculating means includes:

average exhaust pressure-calculating means for calculating an average exhaust pressure which is an average value of the pressure within the exhaust passage during a predetermined time period, and maximum amplitude-calculating means for calculating a maximum amplitude for use in calculating the maximum exhaust pressure, according to the value indicative of the operating condition of the engine, and calculates the maximum exhaust pressure according to the average exhaust pressure and the maximum amplitude.

* * * * *